United States Patent

[11] 3,556,355

| [72] | Inventor | Joseph J. Ruiz<br>Cleveland, Ohio |
|---|---|---|
| [21] | Appl. No. | 732,775 |
| [22] | Filed | May 28, 1968 |
| [45] | Patented | Jan. 19, 1971 |
| [73] | Assignee | Basic Incorporated<br>Cleveland, Ohio<br>a corporation of Ohio |

[54] PRESSURE SEALED ROTARY FEEDER
9 Claims, 13 Drawing Figs.

[52] U.S. Cl. .................................................... 222/368,
 214/17
[51] Int. Cl. ...................................................... G01f 11/10
[50] Field of Search........................................... 222/194,
 368; 302/49; 214/17.68, 17; 103/H1, H2, R1

[56] References Cited
UNITED STATES PATENTS
3,301,605  1/1967  Greenway ..................... 302/49

2,907,499 10/1959 Agronin ........................ 222/368X
3,151,784 10/1964 Tailor............................ 222/368
3,171,693  3/1965 Gillespie....................... 312/49

*Primary Examiner*—Robert B. Reeves
*Assistant Examiner*—Hadd S. Lane
*Attorney*—Oberlin, Maky, Donnelly and Renner ABSTRACT: A pressured sealed rotary feeder with an inlet and outlet and a rotor mounted within a housing with a material passage therethrough. The rotor has a plurality of radially extending vanes which define material transporting compartments therebetween. Sealing means are mounted in each of the vanes of the rotor and include a movable blade which extends transversely of the vane and has a surface in contact with the interior of the passage. The surface is maintained in contact with the interior of the passage by fluid under pressure which is introduced through a passageway within the rotor and the vanes. The surface in contact with the passage is preferably of a heat resistant, self-lubricating plastic such as polytetrafluoroethylene.

PATENTED JAN 19 1971

INVENTOR
JOSEPH J. RUIZ

BY
Oberlin, Maky, Donnelly & Renner
ATTORNEYS

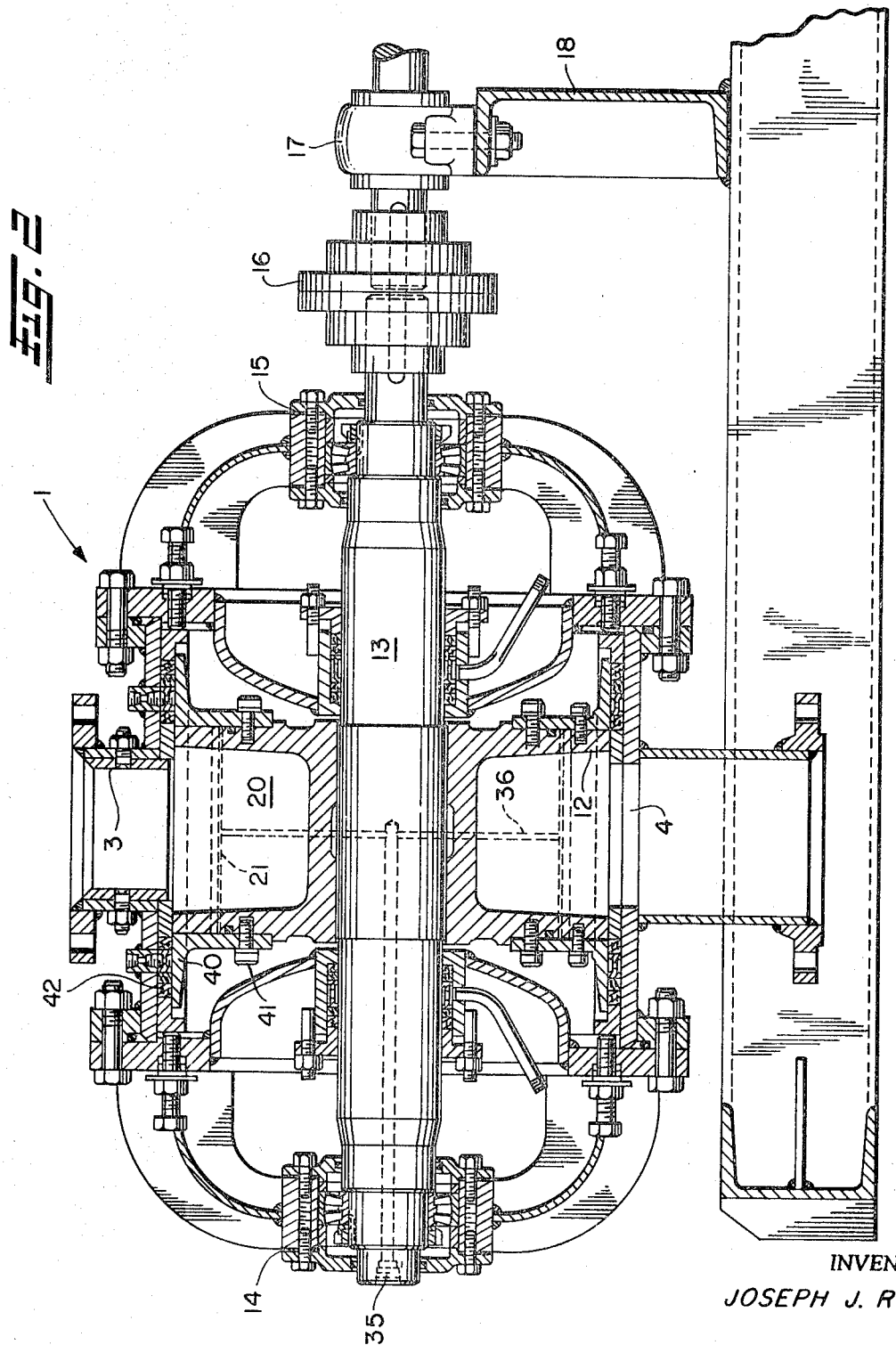

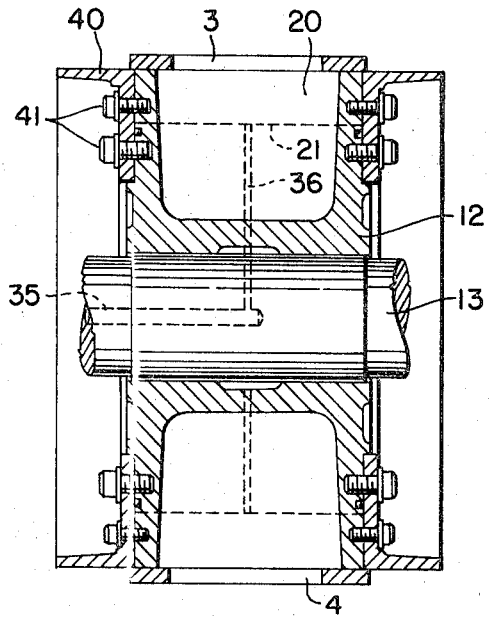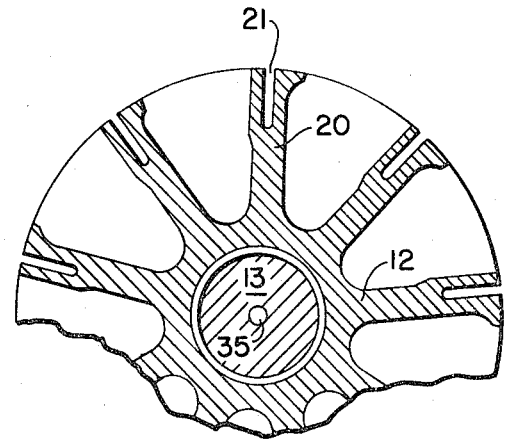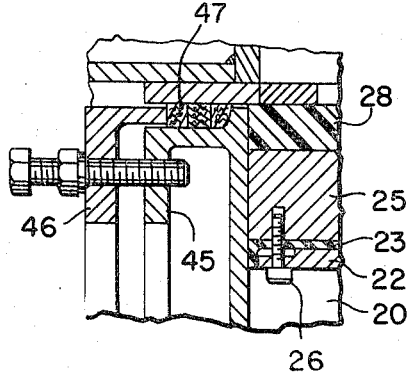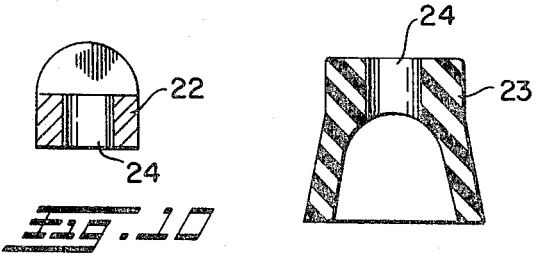

INVENTOR
JOSEPH J. RUIZ

BY
Oberlin, Maky, Donnelly & Renner
ATTORNEYS 3,556,355

PRESSURE SEALED ROTARY FEEDER

This invention relates generally as indicated to a rotary feed device and more particularly to such a device which is especially suitable for the introduction or removal of granular materials to or from a kiln or other processing device which is operated at a substantially higher or lower pressure than atmospheric pressure.

Apparatus for introducing granular materials against a system pressure, consisting of multiple chambers separated by valves operated in sequence, are used even for high pressure differential. Because of their inherent intermittent or batch operation, such apparatus is not suitable for processes requiring a continuous feed.

Rotary type devices are capable of supplying granular materials at a practically uniform rate of feed. To provide a suitable such apparatus for introducing abrasive solids to a vessel under substantially high pressure, many problems are encountered, as it is necessary to insure adequate sealing between the rotor and the interior passage therethrough.

Attempts have been made to machine the vanes of the rotor and the interior of the passage for a close rotating fit, but difficulties in providing lubrication between the rubbing metal-to-metal surfaces result in rapid wear. To overcome such difficulties, it has been proposed to provide the vanes of the rotor with replaceable or manually adjustable sealing blades of nonmetallic materials.

It has also been proposed to provide the vanes of the rotor with shearing elements which coact with the leading edges of the rotary vanes to shear through the material which is delivered into the device. Such device also includes means intended to insure that the shearing elements are radially outwardly biased against the lining of the passage.

It has been found, however, that such devices do not satisfactorily resolve the practical difficulties of operation with relatively high pressure differential (above about 10 to 15 p.s.i.) across the feed valve and with abrasive materials. There is still the need for a device which effectively maintains the seal as the rotor is revolved to convey granular materials in or out of apparatus operated at relatively high gas pressure.

Accordingly, it is a principal object of the present invention to provide a rotary feeder with an improved and effective sealing means.

A further object of the present invention is the provision of a rotary feeding device in which sealing means are included which are capable of longer wear and which are not susceptible to jamming or freezing as the device is used.

Yet another object of this invention is the provision of a rotary feeding device in which the seal between the rotor and the material passage is achieved by coaction between the vanes of the rotor and fluid pressure introduced through the rotor vanes and shaft passages.

It is an additional object of this invention to provide a rotary feeding device in which the sealing means include a heat resistant, self-lubricating plastic.

Other objects, features and advantages of this invention will become apparent to those skilled in the art after a reading of the following more detailed description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 2 is a section view taken on the line 2–2 of FIG. 1;

FIG. 4 is a partial section view showing details of the rotor construction;

FIG. 5 is a fragmentary section view of the rotor;

Figure 12:
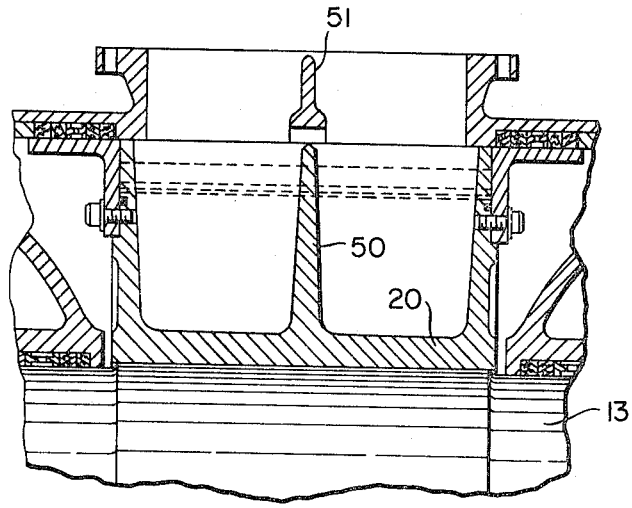
Figure 13:
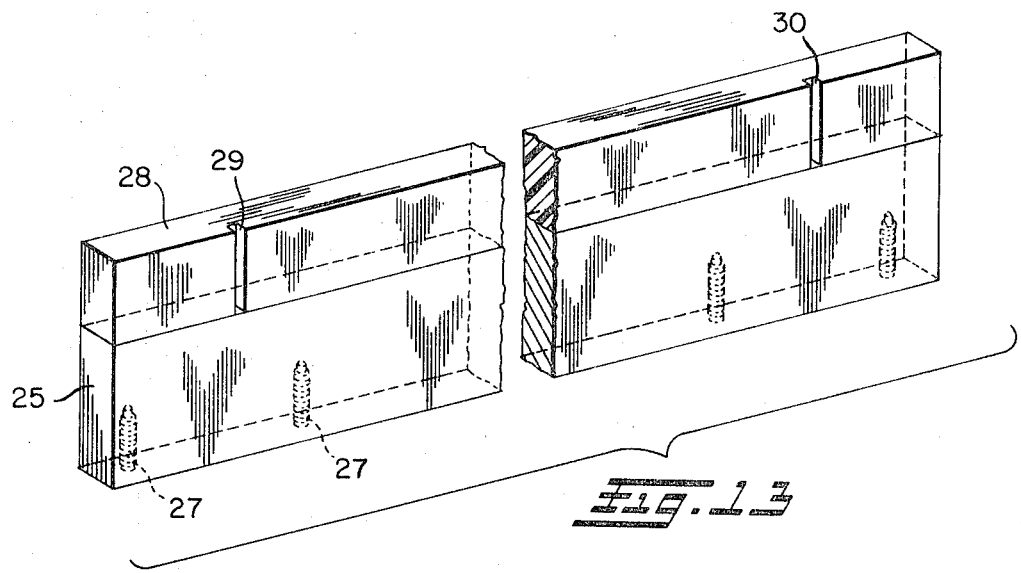

FIGS. 6, 7, 8, 9 and 10 illustrate part of the sealing means, with FIG. 7 being a section view taken on line 7–7 of FIG. 6 and FIG. 8 being a section view taken on line 8–8 of FIG. 7, and FIG. 10 is a section view taken on line 10–10 of FIG. 9;

FIG. 11 is a fragmentary section view illustrating a modified form;

FIG. 12 is a fragmentary section view illustrating the modified form of rotor construction; and FIG. 11 is a fragmentary section view illustrating a modified form;

FIG. 12 is a fragmentary section view illustrating the modified form of rotor construction; and FIG. 13 is a partial perspective view illustrating details of the sealing means.

Figure 1:
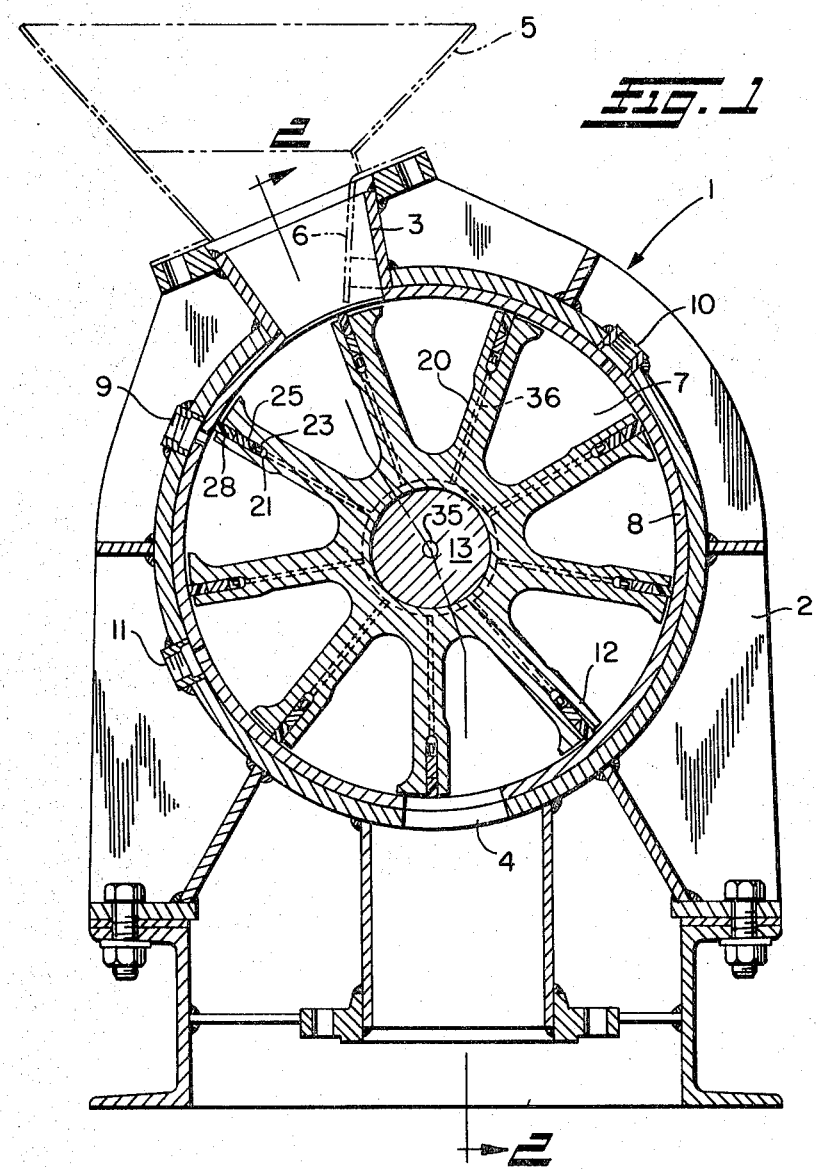
FIG. 1 is a section view of the feeder.

Referring to the drawings and particularly to FIGS. 1 and 2, the rotary feeder is designated generally by the numeral 1 and includes a housing 2 having an inlet 3 and an outlet or discharge end 4. A feed hopper 5 and a deflector plate 6 will also desirably be associated with the inlet. The housing also has a cylindrical passage 7 therein, the axis of which extends transversely to the flow of material from the inlet to the outlet. The cylindrical passage includes a cylindrical lining 8, and an atmospheric vent 9, and equalizing ports 10 and 11 are also provided at the indicated positions about the periphery of the cylindrical passage.

A rotor 12 is mounted within the cylindrical passage of the housing on shaft 13 which is rotatably journaled in bearing assemblies 14 and 15 on opposite sides of the housing. The shaft extends through a shaft coupling 16 and is supported by a pair of pillow blocks 17 (only one of which is shown) mounted on frame 18. The rotor also includes a plurality of vanes 29 20 extending radially therefrom and forming material transporting compartments therebetween in contact with the lining 8 of the cylindrical passage through the movable blade assemblies therein, as explained in more detail hereinafter, to move material from the inlet and to the outlet of the device.

Referring now particularly to FIGS. 3 through 10 inclusive and 13, the details of the rotor and sealing means are best illustrated. The vanes 20 of the rotor each have a slot 21 therein extending transversely of the width of the vane. Within each slot, a movable blade assembly (most clearly shown in FIG. 3) is positioned, which comprises a sealing bar 22 such as stainless steel or bronze with a surface of elastomeric rubber 23 or a similar material thereon. Several materials are suitable for use, with one of the preferred materials being a butadiene-acrylonitrile copolymer ("BUNA-N"). Other materials may also be used, including four elastomers such as those commercially available from E. I. Dupont de Nemours Company under the VITON trade name and 3M Company's FLUOREL.

The elastomeric surface of the sealing bars is preferably separable from the metallic bar and of substantially U-shaped cross section, as best shown in FIG. 8. The sealing bars have a plurality of openings 24 extending therethrough, and a support bar 25 is mounted on the sealing bars by cap screws 26 inserted through openings 24 in the sealing bar 22 and threadedly connected as at 27. The support bar is also preferably of stainless steel, but other metals may be used.

A rotor blade 28 is mounted on each of the support bars, and the upper surface of the blades extend slightly above the vanes and is in contact with the lining 8 of the housing as the rotor and vanes are rotated. The rotor blades also preferably include slots 29 and 30 to provide relief if a leak develops in the seal.

The blades 28 are preferably of a heat resistant self-lubricating plastic such as polytetrafluoroethylene (available commercially under the trade name TEFLON). Other similar materials may also be use, if desired, including polytrichlorofluoroethylene, such as that commercially available under the trade name KEL-F and TEFLON reinforced with approximately 10 to 20 percent glass fibers or asbestos fibers. The blades 28 are mounted on the support bar 25 with a thermosetting synthetic adhesive, as for example a synthetic rubber-phenolic resin based adhesive, RAY-BOND R-81002

(available from Raybestos-Manhattan Inc.) One edge of the rotor blades is treated with an etching solution, after which a coating of the adhesive is applied to the etched edge and the blade is cured at approximately 370° F. for approximately 10 minutes while held in a fixed position.

The rotor has a central passageway 35 communicating with its interior with branch passageways 36 extending therefrom into each of the vanes of the rotor and into slots 21. Fluid, such as air or other fluid which is compatible with the elastomeric surface of bar 22, is introduced through these passageways to the slots in communication with the underside of the sealing bars 22 to cause the rotor blades to be maintained in contact with the lining 8 of the passage.

Figure 3:
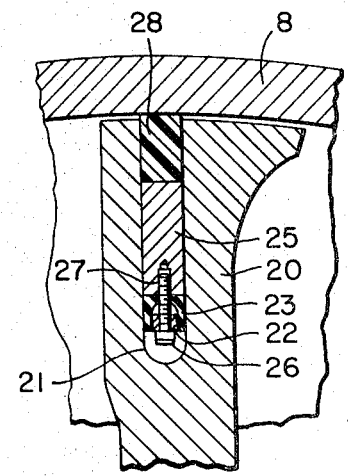
FIG. 3 is a fragmentary enlarged view showing the construction of the sealing means.

The movable blade assembly thus comprises sealing bar 22, support bar 25 and rotor blade 28. The assembly acts as a piston, the fluid under pressure being introduced through passageways 36 forcing the blades 28 into contact with the lining 8 of the cylindrical passage. Also, as shown in FIG. 3, the fluid under pressure bearing against sealing bar 22 forces the sides of the U-shaped elastomeric surface surface 23 outwardly against the walls of slot 21 thereby providing a more effective seal.

To insure that the blades are maintained in contact with the lining, the pressure of the fluid introduced through such passageways is maintained a few pounds above the pressure operating within the vessel. For example, if the vessel pressure is 60 p.s.i., the fluid pressure will be approximately 70 to 75 p.s.i. in order to provide the necessary seal.

The rotor blades will normally be at least approximately three-fourths inches in thickness and of sufficient overall size to withstand the pressures within the vessel and to compensate for wear due to frictional contact with the lining of the housing.

The provision of the supporting bars 25 of steel or some similar material has been found to be beneficial to the results of this invention as the fluid pressure must bear equally across the width of the blade to give the necessary seal. Moreover, such support bars, in providing for uniform distribution of pressure, serve to prevent bulging of the blades and hence provides a more effective seal.

As perhaps most clearly shown in FIGS. 2 and 4, the rotor blades extend across the entire width of the vanes of the rotor and are of a slightly greater width than the opening at the inlet 3 in order to be retained within the vessel at all times during operation. Circumferential flanges 40 are also provided on each end of the rotor, being connected by screws 41, to close the ends of the slots 21 and to hold one side of the rotor peripheral seal 42. Flanges 40 are shown as a separate part from the rotor 12 in order to facilitate the machining of slots 21 in vanes 20, but could be made integral with the rotor casting if suitable means of mahining slots 21 are available.

In FIG. 11, a modified form of flange and rotor arrangement is illustrated in which a plurality of flanges 45 and 46 together with packing 47 are provided to close the end of the slot in the vanes and to provide the rotor peripheral seal. The rotor vane 20 with the movable blade assembly will then rotate as in the previously described embodiment.

A further modification is illustrated in FIG. 12 in which the vanes 20 of the previously described rotor are of a slightly altered construction. As shown, the vanes have a laterally extending projection 50 positioned substantially centrally of the width thereof to provide additional strength to the vanes. Although only one such projection has been shown, it will be appreciated that a plurality thereof can be used, if desired. A dividing means 51 is also illustrated as being positioned within the inlet and outlet to assist in supporting the rotor blades while passing the port openings. A plurality of such dividing means can, of course, be used if desired. This embodiment is particularly advantageous for large size rotary feeders. Since this arrangement is otherwise the same as previously discussed, no further description will be set forth herein.

Although this device has been described as being particularly suitable for use with pressure operated vessels, it is, of course, to be understood that it can be used to feed granular material without the use of pressure. Similarly, although such device has been described as being designed to feed granular material to the inlet of a kiln, it will be appreciated that the device can be used, if desired, at the discharge end of a kiln to transfer material for further processing.

I claim:

1. A rotary feeder device comprising a housing having a cylindrical passage therethrough, the axis of said passage extending transversely to the flow of material through said device, inlet and outlet means communicating with said cylindrical passage, a rotor disposed within said cylindrical passage having a plurality of radially extending vanes thereon defining material transporting compartments therebetween, each of said vanes including a slot extending transversely across the width thereof, a sealing bar positioned within each of said slots including a substantially U-shaped sealing surface, a support bar mounted on said sealing bar in each of said vanes, a rotor blade mounted on each of said support bars, the surface of said blades extending above the upper surface of said vanes in contact with the interior surface of said cylindrical passage, and means communicating with said rotor and at the underside of said sealing bars and said U-shaped sealing surface through which fluid may be introduced to maintain said rotor blades in contact with the interior of said cylindrical passage.

2. The rotary device of claim 1, in which said rotor blades are polytetrafluoroethylene and are mounted on said support bars by a thermosetting synthetic adhesive.

3. The rotary device of claim 2 in which said support bars are stainless steel.

4. The rotary device of claim 2 in which said sealing bars comprise a metallic bar with a surface of butadiene-acryloitrile thereon.

5. The rotary device of claim 1 in which said vanes include projections extending laterally substantially centrally thereof to reinforce structurally said vanes.

6. The rotary device of claim 1 in which said slots extend across the width of said vanes and flanges are provided on said rotor on the opposite sides thereof to close said slots.

7. The rotary device of claim 1 in which said inlet and outlet means include dividing means substantially centrally thereof to assist in supporting said rotor blades.

8. A rotary feeder device comprising a housing with an inlet and outlet, a rotor mounted in said housing having a plurality of radially extending vanes defining material transporting compartments therebetween, a movable sealing assembly mounted in each of said vanes, said sealing assembly including a surface above the radially outer surface of said vanes and lengthwise of the vanes in contact with the interior of said housing, means communicating with said rotor and said sealing assemblies through which fluid may be introduced to maintain said surface in contact with the interior of said housing, each of said vanes including a slot extending transversely thereof, a sealing bar positioned in each of said slots comprising a substantially U-shaped elastomeric surface and an underlying metallic bar, support bars in said vanes mounted on said sealing bars, and a polytetrafluoroethylene blade mounted on each of said transversely extending bars with a thermosetting synthetic adhesive.

9. The rotary device of claim 8 in which said slots extend across the width of said vanes and flanges are provided on said rotor on the opposite sides thereof to close said slots.